May 30, 1967     E. L. BISHOP     3,322,599
TIRE BUILDING DRUM

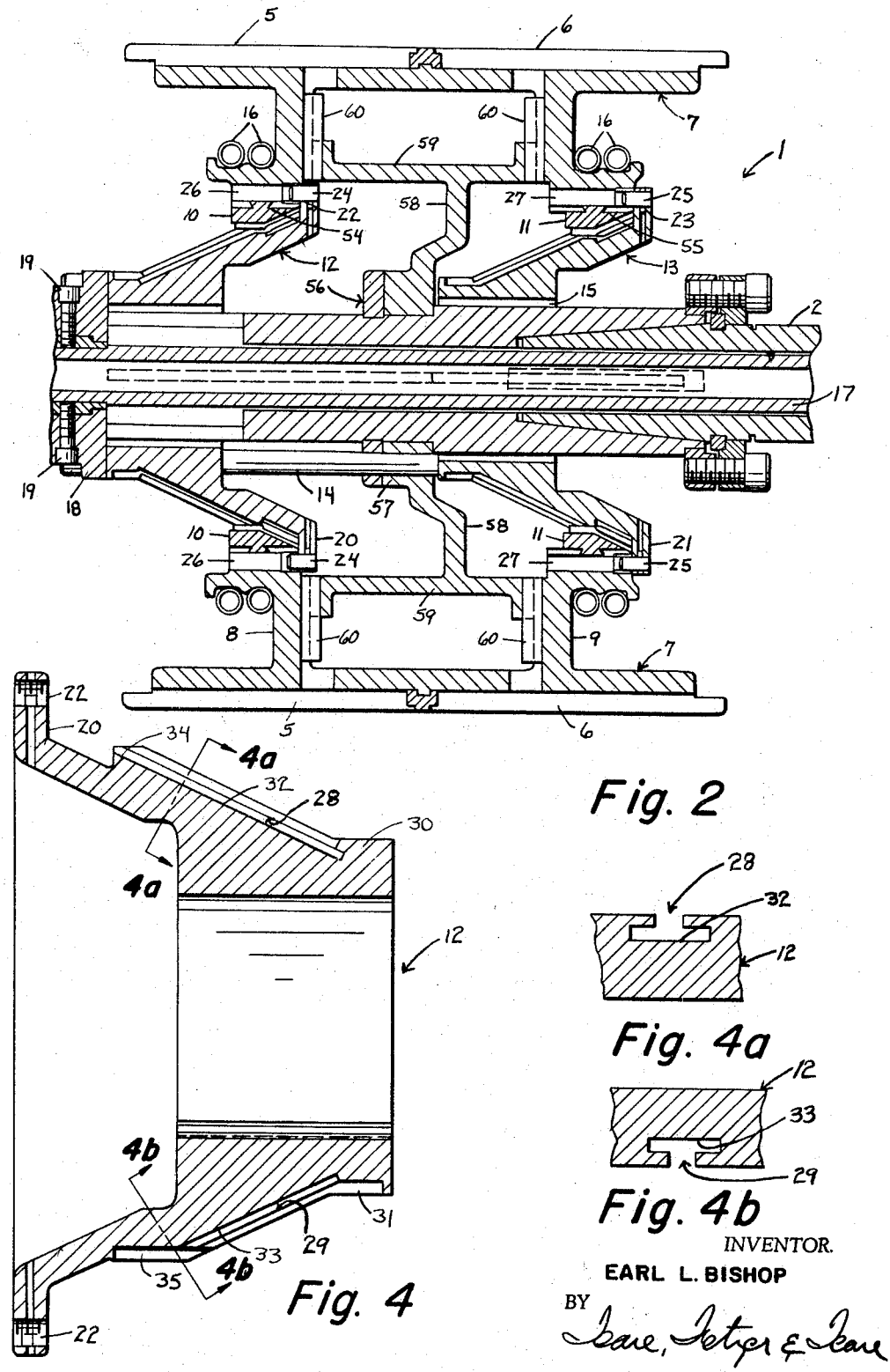

Filed Sept. 10, 1963     3 Sheets-Sheet 3

INVENTOR.
EARL L. BISHOP
BY
*Teare, Tetzer & Teare*
ATTORNEYS

United States Patent Office 3,322,599
Patented May 30, 1967

3,322,599
TIRE BUILDING DRUM
Earl L. Bishop, Cuyahoga Falls, Ohio, assignor to The Akron Standard Mold Company, Akron, Ohio, a company of Ohio
Filed Sept. 10, 1963, Ser. No. 307,830
9 Claims. (Cl. 156—417)

This invention relates to a tire building apparatus, and more particularly relates to an improved tire building drum which may be readily expanded and collapsed for accurately positioning the working surfaces of the drum for building vehicle tires.

Conventionally, the tire building drums have been provided of a type which customarily comprise a plurality of segments arranged for collapsible movement to reduce the drum diameter thus enabling removal of the tire carcass from the drum. Various of the drum segments have heretofore been arranged for swinging movement in axial and/or radial directions for reducing the drum diameter. In such cases, the drum segments have been actuated by bulky and complex hinge or linkage mechanisms that are not only uneconomical with respect to initial construction and subsequent maintenance costs, but which are also unsatisfactory because of the limited space available for such expanding and collapsing mechanisms within the tire building drum.

The collapsing and expanding movement of such mechanisms cannot be controlled with a high degree of precision, thereby causing spaces or gaps between the respective segments with consequent distortion and damage to the tire carcass formed on the drum. Additionally, the wear and strain inherent in such conventional collapsing mechanisms diminishes the precision with which the drum may be utilized resulting in poor structural characteristics in the finished tire carcass when subjected to repeated usage.

Accordingly, an object of the present invention is to provide an improved mechanism for expanding and collapsing the segments of a tire building drum and which is of a relatively simple and rugged construction.

Another object of the present invention is to provide an improved mechanism of the aforementioned type which includes axially movable cam members in a plurality of wear-resistant, block-like cam follower elements coacting therewith which elements facilitate expanding and collapsing of the drum segments and with a minimum of stress and strain on the mechanism.

A further object of the present invention is to provide an improved expanding and collapsing mechanism for tire drum which mechanism includes unitary block-like cam follower elements comprised primarily of anti-friction materials which are highly wear-resistant and economical to produce.

A still further object of the present invention is to provide a plurality of unitary cam follower elements for use with the collapsing mechanism of a tire building drum which elements are quickly and easily replaceable therewith for efficient assembly and disassembly with the drum.

Further objects and advantages, and other new and useful features in the construction, arrangement and general combination of elements for providing radial collapsing and expanding of the tire building drum embodying the present invention, will be apparent to those skilled in the art, as the following description proceeds, with reference to the accompanying drawings, for purposes of illustration, but not of limitation, in which like reference characters designate like parts throughout, wherein:

FIG. 2 is a cross-sectional view taken along the plane of line 2—2 of FIG. 1;

FIG. 4 is a cross-sectional view taken along the plane of line 4—4 of FIG. 3;

FIG. 4a is an enlarged cross-sectional view taken along the plane of line 4a—4a of FIG. 4;

FIG. 4b is an enlarged cross-sectional view taken along the plane of line 4b—4b of FIG. 4;

Figure 1:
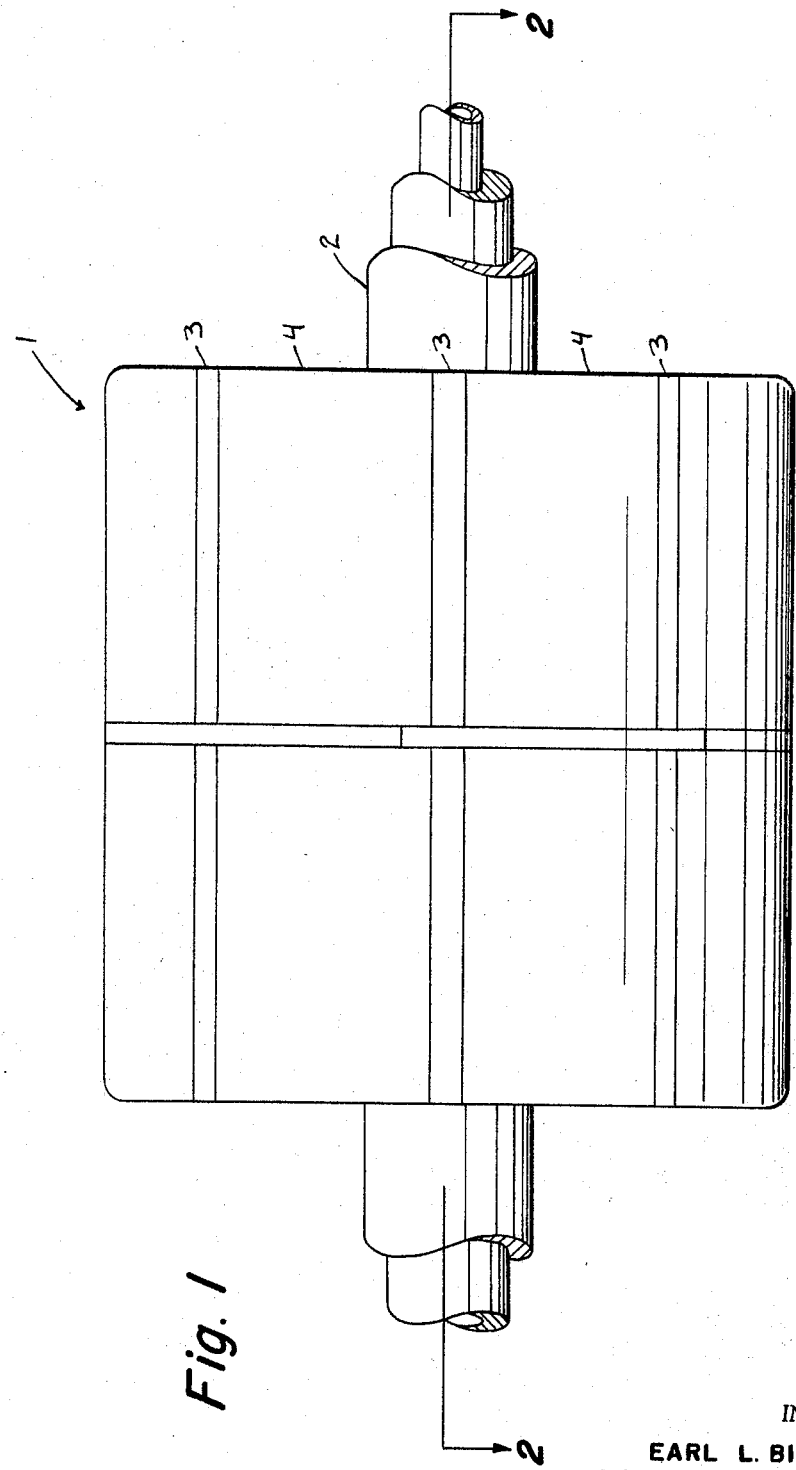
FIG. 1 is a side elevational view, of the tire building drum embodying the present invention, shown in expanded condition and mounted for rotation on a power driven shaft.

Generally, referring to FIGS. 1 and 2 of the drawings the tire building drum, shown generally at 1, is mounted on a rotatable power driven quill 2. The drum includes two sets of alternately disposed segment assemblies, namely, a set of eight smaller segment assemblies 3 and a set of eight larger segment assemblies 4 which coact together when expanded to provide a smooth and uninterrupted tire building surface. Each of the respective segment assemblies 3, 4 preferably includes a pair of generally arcuate wing members 5 and 6 which may be mounted for widthwise adjustment on corresponding segment supporting members 7. In this form, the segment supporting members may be provided with radially inwardly extending generally L-shaped arms 8, 9 having removable, anti-friction cam follower elements 10, 11 adjacent the ends thereof and which elements are adapted for sliding coaction on corresponding cam surfaces provides on a pair of axially movable cone type cam members 12, 13 as will hereinafter be more fully described.

As shown, the cone type cam members 12, 13 may be arranged and attached together, as a unit, in tandem alignment by means of a connecting rod 14 and keyed, as at 15, for axial movement on the power quill 2. Camming coacting between the respective segment assemblies 3, 4 and the axially movable cone type cam members 12, 13 may be maintained during radial expanding and collapsing movement of the drum segments by means of endless extensible clamping elements 16 which coact therewith in a manner to continuously bias the segment assemblies 3, 4 radially inwardly gainst the respective cam members 12, 13.

Radial expanding and collapsing of the drum 1 may be imparted to the segment assemblies 3, 4 by means of a horizontally extending drive shaft 17 which is reciprocably mounted within the power quill 2 and adapted to be actuated by a suitable fluid motor (not shown). The drive shaft 17 may in turn be connected to the cam member 12 by means of an annular collar 18 which is fixedly secured thereto by suitable bolts 19 and which is also fixedly secured to the said cam member 12. Moreover, by such an arrangement, reciprocation of the drive shaft 17 may be translated into axial movement of the respective cone type cam members 12, 13 relative to the outer surface of the power quill 2, to cause radial expanding and collapsing of the segment assemblies 3, 4 relative to the longitudinal axis of the power quill.

Figure 3:
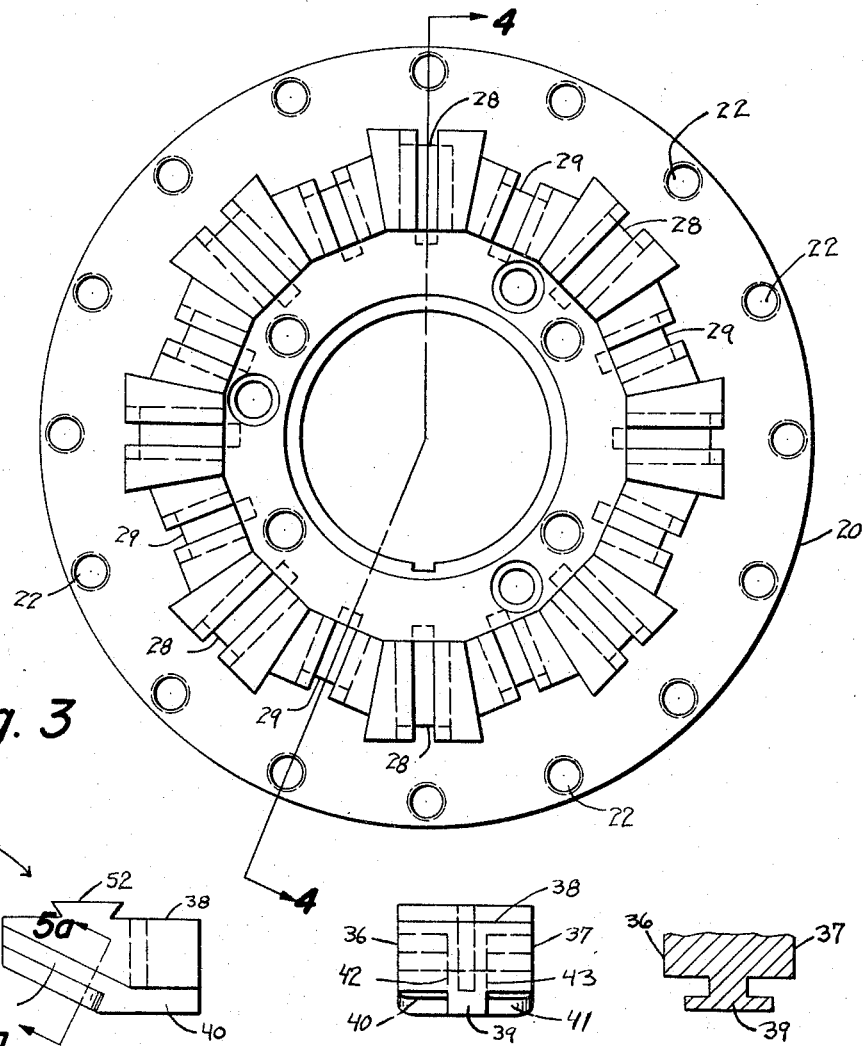
FIG. 3 is an end view showing one of the axially movable cone type cam members, removed from the assembly.
Figures 5, 5A, 6:
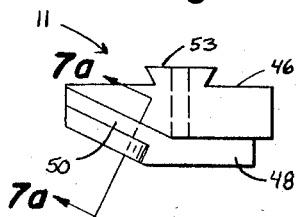
FIG. 5 is a front elevational view, on a slightly enlarged scale, showing one of the anti-friction cam follower elements of the present invention which is adapted for sliding coaction on the cone type cam members for expanding and collapsing of larger drum segments, said elements being removed from the assembly.
FIG. 5a is a cross-sectional view taken along the plane of line 5a—5a of FIG. 5.
FIG. 6 is an end view of the cam follower element of FIG. 5 looking from the right side thereof.

More particularly, and with reference to FIGS. 2 and 3 of the drawings, the cam members 12, 13 are shown as being preferably of an identical construction, each of which is of a generally cone-shaped configuration having an integral, generally circular flange portion 20, 21 extending radially outwardly adjacent one end thereof. The flange portion of each of the respective cones may be provided with a predetermined number (sixteen) of symmetrically spaced openings 22, 23 which receive therethrough axially extending bearing lugs 24, 25 (FIG. 2) which lugs are adapted to be slidably received within correspondingly registered bearing slots 26, 27 provided in the L-shaped arms 8, 9 of the respective segment supporting members 7. Moreover, axial movement of the cam members 12, 13 relative to the power quill 2, brings the drum to a fully expanded condition (FIG. 2), whereby sliding registration of the bearing lugs 24, 25 within the corresponding bearing slots 26, 27 results in locking the drum segments together to provide a rigid and uninterrupted tire building surface.

As shown in FIGS. 3 and 4 of the drawings, each of the cone type cam members 12, 13 is provided with a larger and smaller set of eight alternately disposed T-shaped (in vertical cross section) keyway slots designated generally at 28 and 29, respectively. The number of such keyway slots 28, 29 will vary in each case dependent upon the desired drum diameter for a particular tire building application. In this form, the keyway slots 28, 29 include generally axially extending surfaces 30, 31 of predetermined length which open onto generally inclined surfaces 32, 33 that extend angularly toward the axis of the drum 1 and which terminate in other axially extending surfaces 34, 35. The relative difference in length between the axially extending surfaces 30, 31 and inclined 32, 33 surfaces of the respective alternately disposed keyway slots 28, 29, results in the smaller segment assemblies 3 moving radially inwardly before inward movement of the larger segment assemblies 4, such that the larger segment assemblies 4 can be collapsed in overlapping relation upon the smaller segment assemblies 3 upon radial collapsing of the drum.

As shown in FIGS. 2 and 5–8, the generally L-shaped arms 8, 9 extending from the respective segment supporting members 7 are each provided adjacent one end thereof with one of the removable type cam follower elements 10, 11 of the present invention. The cam follower elements 10, 11 are preferably comprised of suitable antifriction metal or metal alloy material, such as brass, bronze or the like, which provides a smooth, friction-free sliding coaction within the key-way slots 28, 29 on the respective cone members 12, 13.

The cam follower elements 10 which slidably coact within the keyway slots 28 for radially expanding and collapsing the larger segment assemblies 4 are preferably of a square or rectangular configuration in end elevation (FIG. 6) having oppositely disposed parallel sides 36, 37 and a generally flat upper surface 38. To effect such camming coaction, the cam follower elements 10 are preferably provided on their under surface with an inverted T-shaped rib 39 which defines on either side thereof open, generally axially extending grooves 40, 41 which communicate with an open, generally upwardly inclined groove 42, 43 which define the aforementioned inverted T-shaped keyway for registration within the corresponding keyway slots 28 on the respective cone members 12, 13.

The other cam follower elements 11 which slidably coact within the other keyway slots 29 on the respective cone members 12, 13 for actuation of the smaller segment assemblies 3 are preferably of an inverted truncated cone-shaped configuration in end elevation (FIG. 8) having convergently tapered and oppositely disposed parallel side wall portions 44, 45 and a flat upper top portion 46. Such convergently tapered side wall construction provides a continuous circumferential abutting engagement relative to the other follower elements 10 and enables the smaller segment assemblies 3 to be radially collapsed prior to collapsing of the larger segment assemblies 4, as aforesaid.

Figures 7, 7A, 8:
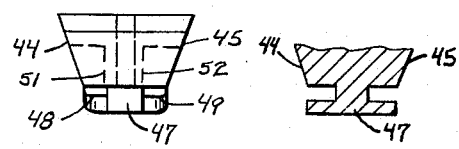
FIG. 7 is a front elevational view on a slightly enlarged scale showing another one of the anti-friction cam follower elements of the present invention which is adapted for sliding coaction on the cone type cam members for expanding and collapsing the smaller drum segments, said element being removed from the assembly.
FIG. 7a is a cross-sectional view taken along the plane of line 7a—7a of FIG. 7.
FIG. 8 is an end view of the cam follower element of FIG. 7 looking from the right side thereof.

As best shown in FIG. 7, the cam follower elements 11 are provided on their under surface with an inverted T-shaped rib 47 which defines on either side thereof open, axially extending grooves 48, 49 which communicate with open, upwardly inclined grooves 50, 51 to provide the aforementioned inverted T-shaped keyway for registration within the corresponding keyway slot provided on the cone members. In this form, the respective cam follower elements 10, 11 may be provided on their upper surface with upstanding dovetail rib portions 52, 53 for removably attaching the respective cam follower elements within corresponding dovetail slots 54, 55 (FIG. 2) provided on the under surface of the L-shaped arms 8, 9 which extend from the segment supporting members 7. By such an arrangement, the cam follower elements 10, 11 provide a smooth, friction-free sliding coaction upon the axially movable cone type cam member 12, 13 and with a minimum amount of wear on the cam surfaces such that the drum segments can be expanded and collapsed any number of times and with the same degree of precision. In addition, such cam follower elements can be readily replaced when worn without the necessity of refinishing or re-grinding the respective cam surfaces.

To further guide and steady the precision expanding and collapsing of the drum segments there is provided a centrally disposed guide unit designated generally at 56. As shown in FIG. 2, the guide unit 56 includes an annular hub member 57 fixedly secured on the power quill 2. The hub 57 is preferably located on the quill 2 such as to act as an abutment means for limiting axial movement of the cone member 13 to the left (FIG. 2), thereby controlling, within predetermined limits, radial expansion of the drum segments. The hub 57 may be provided with a plurality of spaced, radially extending arms 58, each of which is provided with an integral, generally U-shaped guide bracket 59 adapted for sliding engagement on oppositely disposed guide blocks 60 secured to the inner surface of the segment supporting arms 8, 9. Again, the number of guide brackets 59 extending from the hub 57 will correspond to the number of segment assemblies 3, 4 required for a particular drum diameter. The guide blocks 60 may be composed of a suitable friction bearing material, such as brass, bronze or the like, to facilitate sliding coaction of the respective guide brackets thereon.

In operation of the tire building apparatus of the present invention, the drive shaft 17 may be reciprocably actuated so as to impart an axial movement to the respective cone-type cam members 12, 13. Such axial movement of the cam members 12, 13 results in a camming coaction relative to the cam follower elements 10, 11 mounted on the respective segment support members 7 causing the drum 1 to be expanded radially into its fully expanded position, as shown in FIG. 2. In the expanded condition, various types of fabric plies may be wrapped around the drum and at proper periods during the operational cycle, the bead setting and stitching operations may be performed upon the fabric plies. Upon completion of the tire building operation, the drive shaft may be reciprocated in the opposite direction causing the segment assemblies to radially collapse such as to provide a sufficient clearance for removal of the tire from the drum, whereupon the drum is in a condition for another cycle of operation.

Accordingly, it can be seen that the tire building drum of the present invention provides a relatively simple, economical and yet highly precisioned, compact arrangement for radially expanding and collapsing the drum to provide a continuous and uninterruped tire building surface. The novel cam follower elements of the present invention provide a precision expanding and collapsing of the drum segments with a minimum of wear on the cam surfaces and substantially reduces the stress and strain on the collapsing mechanism during repeated usage thereof.

I have shown and described what I consider to be the preferred embodiment of my invention, together with suggested forms, and it will be obvious to those skilled in the art that any other changes may be made without departing from the scope of my invention as defined by the appended claims.

I claim:

1. In a tire building drum having a plurality of collapsible segments adapted to be radially expanded and collapsed comprising, cam means mounted for axial movement relative to said segments, each segment including detachable, block-like cam follower elements mounted thereon and slidably engageable with said cam means, said cam follower elements being comprised of an antifriction material for free sliding coaction on said cam means, said cam follower elements being detachably connected to said segments, said cam means having a plurality of inclined, recessed keyway slots, and said cam follower elements each having correspondingly inclined key portions disposed for sliding engagement in said keyway slots, whereby axial movement of said cam means in one direction radially expands said segments and vice versa upon movement of said cam means in the opposite direction.

2. In a tire building drum in accordance with claim 1, wherein said cam follower elements are connected to the segments by a dove-tail connection, said connection comprising a dove-tail recess in an associated one of the segments adapted to slidably receive therein an upstanding dove-tail projection on the associated cam follower element.

3. In a tire building drum in accordance with claim 1, wherein said keyway slots are of a T-shaped configuration in cross section, and wherein said key portions are of a T-shaped configuration in the cross section.

4. In a tire building drum in accordance with claim 1, wherein said keyway slots each have axially and angularly extending surface portions of different dimensional length relative to corresponding axially and angularly extending surface portions on said key portions for moving certain of said segments radially in advance of others of said segments, upon collapsing of the drum, and vice versa upon expanding of the drum.

5. In a tire building drum in accordance with claim 1, wherein said cam means includes a plurality of spaced holes containing bushing members disposed therein, said segments having complimentary spaced holes adapted to receive said bushing members in generally coaxial alignment therein upon axial movement of said cam means to maintain the segments in the expanded condition of the drum.

6. In a tire building drum in accordance with claim 1, wherein said cam follower elements include block-like body each having an integral rib extending longitudinally thereof, said rib having an inclined, inverted T-shaped portion at one end defining a pair of oppositely disposed inclined grooves, said grooves being inclined at substantially the same angle as the keyway slots in said cam means.

7. In a tire building drum in accordance with claim 6, wherein the other end of said rib defines on either side thereof a pair of axially extending grooves which communicate with said inclined grooves, said axially extending grooves adapted for engageable coaction on correspondingly axially extending surface portions on said cam means in the collapsed position of said drum.

8. In a tire building drum having a plurality of collapsible segments adapted to be radially expanded and collapsed, a cam member mounted for axial movement relative to said segments, each segment having a cam follower element thereon and engageable with such cam member, said cam follower element having an inclined, generally T-shaped male portion, and said cam member having a correspondingly inclined, generally T-shaped female portion coacting with the complimentary T-shaped male portion on said cam follower element, whereby axial movement of said cam member in one direction radially expands said segments, and wherein said cam member includes spaced holes containing bushing members tightly fitted therein, said segments having complimentary spaced holes adapted to receive said bushing members in coaxial alignment therein upon axial movement of said cam member to rigidly maintain the segments in the expanded condition of the drum.

9. In a tire building drum having a plurality of drum segments adapted to be radially expanded and collapsed, a cam member mounted for axial movement relative to said drum segments, each segment having cam follower elements thereon adapted for engagement with said cam member, said cam follower elements having inclined, generally T-shaped male portions thereon, said cam member having correspondingly inclined, generally T-shaped female portions coacting with the complimentary T-shaped male portions on said cam follower elements, and certain of the inclined, generally T-shaped female portions of the cam member being of a relatively greater length than other of said portions, whereby certain of said drum segments are radially expanded in advance of other of said drum segments upon axial movement of said cam member, and wherein said cam member includes a generally annular flange portion having a plurality of spaced holes containing bushing members tightly fitted therein, said drum segments having complimentary spaced holes adapted to receive said bushing members in coaxial alignment therein upon axial movement upon said cam member to rigidly maintain said segments in the expanded condition of the drum.

References Cited

UNITED STATES PATENTS

| 2,996,108 | 8/1961 | Beebee | 156—417 |
| 3,140,216 | 7/1964 | Shilts et al | 156—417 |
| 3,178,331 | 4/1965 | Bishop et al. | 156—415 |

EARL M. BERGERT, *Primary Examiner.*

HAROLD ANSHER, *Examiner.*